No. 864,841. PATENTED SEPT. 3, 1907.
L. B. GAST & J. GAST, Jr.
VEHICLE RIM.
APPLICATION FILED MAR. 13, 1906.

Witnesses:
Edna Bortz
Glenara Fox

Inventors
L. B. Gast and
J. Gast, Jr.
by C. E. Humphrey
Atty.

UNITED STATES PATENT OFFICE.

LOUIS B. GAST AND JACOB GAST, JR., OF AKRON, OHIO.

VEHICLE-RIM.

No. 864,841.   Specification of Letters Patent.   Patented Sept. 3, 1907.

Application filed March 13, 1906. Serial No. 305,824.

*To all whom it may concern:*

Be it known that we, LOUIS BERNARD GAST and JACOB GAST, Jr., citizens of the United States, residing at Akron, in the county of Summit and State of Ohio, have invented new and useful Improvements in Vehicle-Rims, of which the following is a specification.

This invention relates to vehicle wheel rims adapted to seat pneumatic, solid or cushion tires of elastic material, more particularly pneumatic tires of the double-tube type, having contractible, inextensible or semi-inextensible bands or edges, and the object thereof is to so construct the rim as to enable the tire to be readily applied thereto, and to be securely locked in position thereon and easily removed when desired.

A further object of this invention is to provide a new and improved rim for a wheel upon which the tire is to be mounted, provided with means for suitably seating a tire-retaining device thereon, and to further provide a novel tire-retaining device capable of coöperation with said rim.

The invention further aims to construct the tire-retaining means so that when in position it will be locked against circumferential motion and also held from sidewise displacement.

With the foregoing and other objects in view, the invention consists of the novel construction, combination and arrangement of parts constituting the invention to be hereinafter referred to and illustrated in the accompanying drawings which form a part of this specification in which is shown the preferred embodiment of the invention, but it is to be understood that changes, variations and modifications can be resorted to which come within the scope of the claims hereunto appended.

Figure 1:
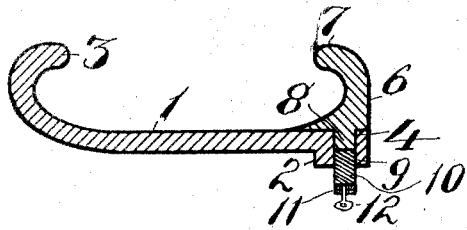
Figure 2:
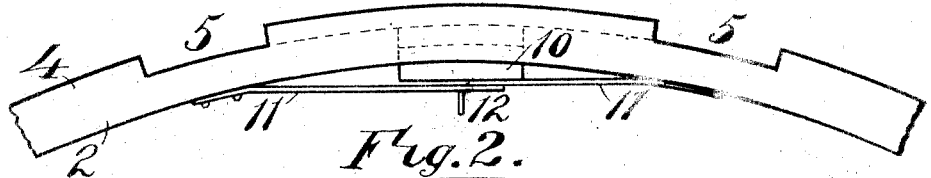
Figure 3:
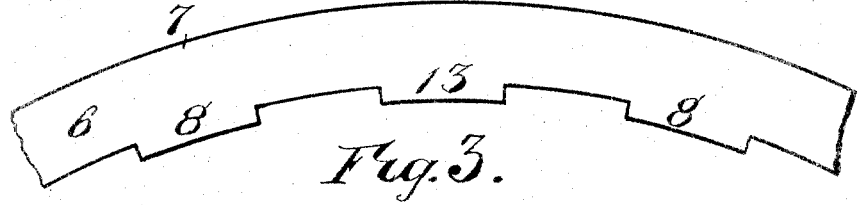
Figure 4:
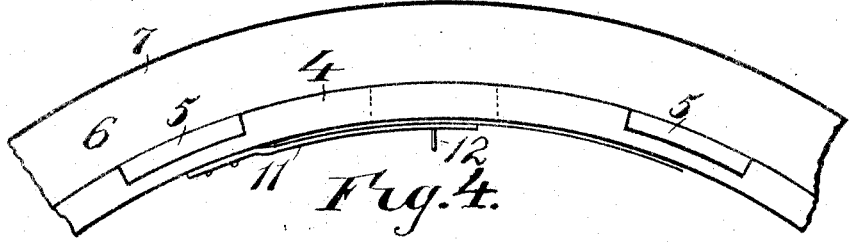

In the drawings, in which similar reference numerals indicate like parts in the different figures: Figure 1 is a cross-section of a vehicle wheel rim constructed in accordance with this invention, also showing in cross-section the detachable retaining means for securing the tire, said retaining means arranged in position to receive that form of tire known as the "clencher" type; Fig. 2 is a side elevation of a rim shown in Fig. 1; Fig. 3 is a view similar to Fig. 2 of the detachable tire-retaining means; and, Fig. 4 is a side elevation of a vehicle wheel rim embodying my invention.

Referring to the drawings, 1 denotes a flat rim having one side formed with an endless offset 2 of a cross-sectional configuration to suitably receive a tire-retaining device and form a seat therefor.

In the construction shown, the offset 2 is on the level with or depends below the upper face of the rim. The opposite side of the rim has an upwardly-extending endless inclined curvilinear flange 3, constituting a tire-retaining means for one side of a tire. The offset 2 is provided with an outer upwardly-extending flange 4. At regularly-recurring intervals in this flange 4 are cut a series of notches 5 which extend in depth to the bottom of the seat in the offset 2. The tire-retaining device which is arranged to be used for retaining a tire on the side opposite to that retained by the curvilinear flange 3, consists of an uninterrupted annular member 6 having an upper portion thereof, designated in the drawings by the reference numeral 7, shaped to engage the base or shoe portion of a tire, and to correspond in contour to the shape of the flange 3. The diameter of the interior of the main portion of this member 6 is slightly greater than the diameter of the rim 1, so that it may fit thereover and seat thereon. Extending inwardly from the inner face of the main portion of the member 6 are a series of regularly-recurring lugs 8, 8, of a size to nicely pass through the notches 5 in the flange 4.

In order to prevent any accidental circumferential motion of the member 6 in its seat, there is cut through the bottom of the offset 2 a slot 9 in which is placed a key 10. This key 10 is of such a size that when raised so that its under face is flush with the under face of the offset 2, its upper portion will project upwardly into the groove or seat in the offset 2 and be substantially flush with the outer face of the rim 1. In order to normally maintain this key in the position just described, we employ two springs, designated in the drawings by the reference numerals 11, which are fastened to the under face of the offset 2 and have the normal tendency to raise the key 10 into such a position as to project into the seat in the offset 2. The under face of the key 10 bears a hook or eye 12, the shank-end of which passes through suitable slots in the springs 11 and the function of which will be described later. The key 10 is placed in the offset 2 at a point directly opposite the point in the flange 4 where one of the notches 5 would normally occur, but the notch at this point is omitted, for a purpose which will later appear. In placing the member 6 in its seat in the offset 2, the member 6 is so placed that one of the lugs, designated in the drawings by the reference numeral 13, is immediately opposite the place where the key 10 occurs, and then the member 6 is inclined with that portion which contains the lug 13 forward and placed over the top of the flange 4; and as the member 6 descends towards its seat in the offset 2, the lug 13 will press the key 10 downwardly sufficiently to cause it to become flush with the bottom face of the seat in the offset 2; then the balance of the member 6 is swung sidewise into position, which is permitted by the fact that the lugs 8 will register with the corresponding notches 5. The key 10 being now flush with the bottom of the seat in the offset 2, no obstruction is offered to a partial rotation of the member 6 in its seat, and it is then rotated sufficiently to bring one of the spaces existing between the lugs 8 and 13 in the member 6 over the point where the key 10 is, which will then be forced upward into this space by reason of the influence of the springs 11. The position of the key 11 is then between one of the lugs 8 and the lug 13, which securely locks the member 6 from circumferential motion in its seat. In order to withdraw the member 6, the hook or eye 12 is grasped by a suitable tool and the key 10 drawn out of the seat in the offset 2 sufficiently to permit a reverse rotation of the member 6 until it has reached a point where the lugs 8 will register with the notches 5, and it is then removed from the rim in an identical and reverse manner to that employed in seating it.

What I claim and desire to secure by Letters Patent, is:—

1. A vehicle wheel rim of the class described comprising a tire-seat having a tire-retaining means along one side thereof and provided on the other side with a channel below the tire-seat with an outer wall extending approximately as far as the plane of said tire-seat, said outer wall of said channel being provided with an interrupted series of notches occurring at approximately regular intervals except at the point where a notch is omitted and an endless ring having its outer portion shaped to constitute a tire-retaining element with its base approximately flat and of sufficient width to cover said channel, provided on its inner face with an uninterrupted series of inwardly-projecting lugs spaced apart from each other a distance equal to that intervening between the notches in the side wall of said channel whereby in seating said ring one of the lugs may be passed over the uncut portion of said outer wall and the balance of the ring swung laterally into position, the balance of the lugs on said ring passing through the notches in said wall and interlocking with those portions of the wall between said notches.

2. A vehicle wheel rim of the class described comprising a tire-seat having a tire-retaining means along one side thereof and provided on the other side with a channel below the tire-seat with an outer wall extending approximately as far as the plane of said tire-seat, said outer wall of said channel being provided with an interrupted series of notches occurring at approximately regular intervals except at the point where a notch is omitted, said channel being further provided with an opening through the bottom thereof located opposite the uncut portion of said wall, an endless ring having its outer portion shaped to constitute a tire-retaining element with its base approximately flat and of sufficient width to cover said channel provided on its inner face with an uninterrupted series of inwardly-projecting lugs spaced apart from each other a distance equal to that intervening between the notches in said wall of said channel whereby in seating said ring one of the lugs may be passed over the uncut portion of said outer wall and the balance of the ring swung laterally into position, the balance of the lugs on said ring passing through the notches in said wall and interlocking with those portions of the wall between said notches, and a locking device operating through the opening in said channel for engagement with the inwardly-extending lugs on said ring thereby preventing circumferential motion thereof.

3. A vehicle wheel rim of the class described comprising a tire-seat having a tire-retaining element along one side thereof provided on the other side with a channel below the tire-seat with an outer wall extending approximately as far as the plane of said tire-seat, said outer wall of said channel being provided with an interrupted series of notches occurring at approximately regular intervals except at the point where a notch is omitted, said channel being provided opposite the uncut portion of said side wall with an opening through the bottom thereof, an endless ring having its outer portion shaped to constitute a tire-retaining element with its base approximately flat and of sufficient width to cover said channel provided on its inner face with an uninterrupted series of inwardly-projecting lugs spaced apart from each other a distance equal to that intervening between the notches in the side wall of said channel whereby in seating said ring one of the lugs may be passed over the uncut portion of said outer wall and the balance of the ring swung laterally into position, the balance of the lugs on said ring passing through the notches in said wall and interlocking with those portions of the wall between said notches, and a key operating through the opening in said channel for engaging the notches on said ring whereby said ring is locked against circumferential motion.

4. A vehicle wheel rim of the class described comprising a tire-seat having a tire-retaining element along one side thereof provided on the other side with a channel below the tire-seat with an outer wall extending approximately as far as the plane of said tire-seat, said outer wall of said channel being provided with an interrupted series of notches occurring at approximately regular intervals except at the point where a notch is omitted, said channel being provided opposite the uncut portion of said side wall with an opening through the bottom thereof, an endless ring having its outer portion shaped to constitute a tire-retaining element with its base approximately flat and of sufficient width to cover said channel provided on its inner face with an uninterrupted series of inwardly-projecting lugs spaced apart from each other a distance equal to that intervening between the notches in the side wall of said channel whereby in seating said ring one of the lugs may be passed over the uncut portion of said outer wall and the balance of the ring swung laterally into position, the balance of the lugs on said ring passing through the notches in said wall and interlocking with those portions of the wall between said notches, a key operating through the opening in said channel for engagement with the lugs on said ring for preventing circumferential motion thereof, and a spring for maintaining said key in locking position in said channel.

In testimony whereof we have hereunto set our hands in presence of two subscribing witnesses.

LOUIS B. GAST.
JACOB GAST, Jr.

Witnesses:
C. E. HUMPHREY,
GLENARA FOX.